United States Patent Office

2,840,560
Patented June 24, 1958

2,840,560

ANTHRAQUINONE VAT DYESTUFFS

Paul Sutter, Binningen, Switzerland, assignor to Ciba Limited, Basel, Switzerland No Drawing. Application July 17, 1952
Serial No. 299,491

Claims priority, application Switzerland July 24, 1951

12 Claims. (Cl. 260—256.4)

This invention provides new anthraquinone vat dyestuffs which, like the dyestuffs of the formulae (1)

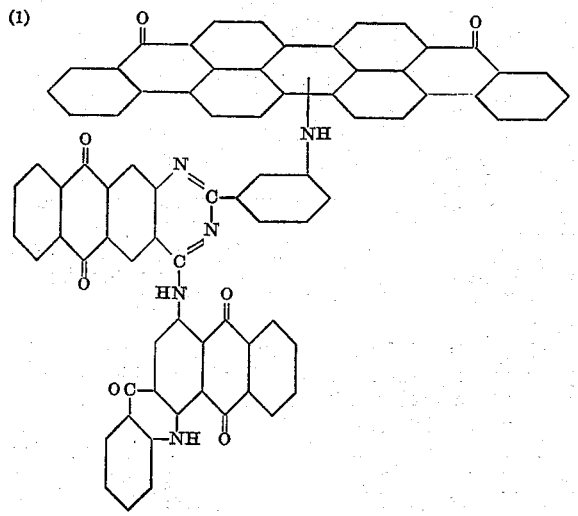

and (2)

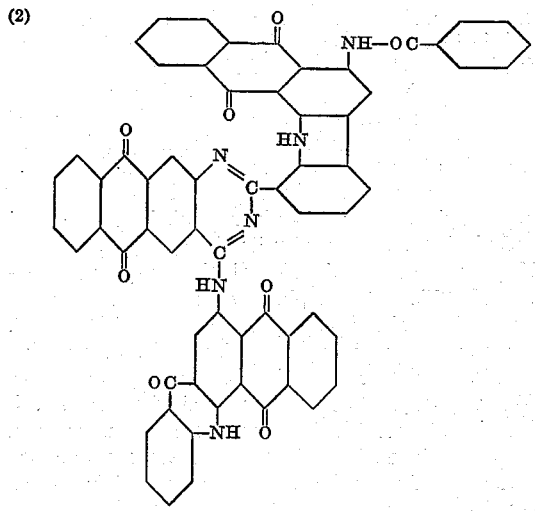

correspond to one of the general formulae (3)

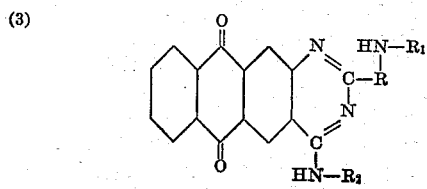

and (4)

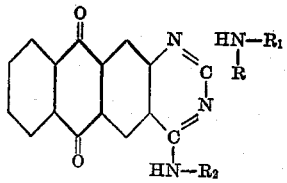

in which R represents an aromatic radical, $R_1$ represents a vattable radical bound to the —NH— group by a ring carbon atom which is in a position vicinal to a ring carbon atom bound to hydrogen in the case of Formula 3 or bound directly to R in the case of Formula 4, and $R_2$ represents a cyclic radical containing at least one aromatic 6-membered ring.

These dyestuffs are made in accordance with the invention by condensing with a vattable primary amine a compound of the formula (5)

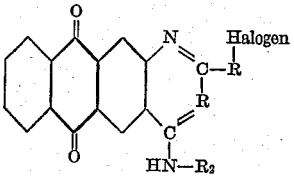

in which R represents an aromatic radical, and $R_2$ represents a cyclic radical containing at least one aromatic 6-membered ring, and, if desired treating the condensation product so obtained with a carbazolizing agent.

The compounds of Formula 5 used as starting materials are advantageously made by condensing a 2-halogen-aryl-4-halogen-6:7-phthaloyl-quinazoline of the formula (6)

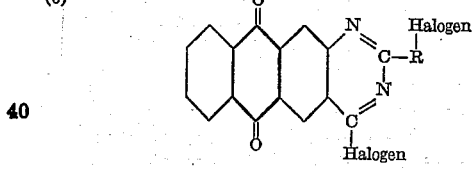

with an amine of the formula $H_2N$—$R_2$, in which $R_2$ has the meaning given above. The 2-halogenaryl-4-halogen-6:7-phthaloyl-quinazolines used as starting materials for the condensation can in their turn be made by methods in themselves known by reacting a 2-(halogen-aroyl-amino)-anthraquinone-3-nitrile such, for example, as 2-(ortho-chlorobenzoylamino)-, 2 - (meta-bromobenzoyla-mino)-, 2-(para-bromobenzoylamino)-, 2-[2'-chloronaphthoyl - (3') - amino]- or 2 - [4" - bromo-diphenoyl - (1')-amino]-anthraquinone-3-nitrile, with phosphorus pentachloride.

As amines of the formula $H_2N$—$R_2$ there come into consideration, for example, mononuclear or polynuclear aromatic amines such as aniline, 2-chloro-1-aminobenzene, 1- or 2-aminonaphthalene, 3-aminopyrene or vattable amines, especially amines which contain the anthraquinone radical, such as 2-aminoanthraquinone or aminoanthraquinones having further substituents or fused rings, for example, acridone rings. As suitable amines of these constitutions there may be mentioned, for example, 1-amino-4- or -5- benzoyl-aminoanthraquinone, α-amino-anthraquinone-2:1(N)-benzacridones such as 4-, 5- or 8-aminoanthraquinone - 2:1(N) - benzacridone, 4 - amino-anthraquinone - 2:1(N) - 1':2'(N) - naphthacridone, 4-aminoanthraquinone - 2:1(N) - 3' - phenoxy - benzacri-done or 4-aminoanthraquinone-2:1(N)-5'-chlorobenzacri-done.

The amines of the formula $H_2N-R_1$ to be condensed with the compounds of the Formula 5 contain a vattable radical, for example, a dibenzanthrone residue or a 1:9-isothiazole-anthrone radical bound in the 4- or 5-position to the amino group. Numerous valuable dyestuffs can be made from aminoanthraquinones which may contain, in addition to the amino group, standing for example, in the 1-position, further substituents of the kind usual in vat dyestuffs. Valuable aminoanthraquinones are, for example, 1-aminoanthraquinone, 1-amino-4-methoxyanthraquinone, the aminoanthraquinone - acridones mentioned above, aminodianthrimides such as 4- or 5-amino-1:1'-dianthrimide and especially α-amino-α-aroylamino, preferably α-amino-α-benzoylaminoanthraquinones, such as 1-amino-8- or -5- or -4-benzoylaminoanthraquinone.

The condensation of the compounds of the Formula 6 with the amines of the formula $H_2N-R_2$ is advantageously carried out by heating the reactants together in a high boiling organic solvent. Especially good results are generally obtained by the use of phenol or a mixture of nitrobenzene and phenol. If desired the condensation products of the Formula 5 so obtained may be purified before further condensation with the amines of the formula $H_2N-R_1$, for example, by dissolution in concentrated sulfuric acid and the addition of sufficient water or dilute sulfuric acid to the solution to precipitate the condensation product and leave the impurities substantially wholly in solution.

The condensation of the compounds of the Formula 5 with the vattable amines of the formula $H_2N-R_1$ proceeds less easily than the preceding condensation described above. Accordingly, it is generally of advantage not only to carry out this condensation also in a high boiling organic solvent such as nitrobenzene or naphthalene, but also to work with the addition of an acid binding agent such as potassium acetate and/or potassium carbonate and also to add copper or a copper salt such as cupric acetate.

When the two amines $H_2N-R_2$ and $H_2N-R_1$ to be condensed in succession with the two halogen aryl-4-halogen-6:7-phthaloyl-quinazoline have the same constitution, both condensations may be carried out in a single operation without the separation of any intermediate product. It is also possible to condense those compounds of the Formula 5 which still contain in the radical $R_2$ a reactive halogen atom, for example, those obtained from 1 molecular proportion of a 2-halogenaryl-4-halogen-6:7-phthaloyl quinazoline and 1 molecular proportion of 2-chloro-1-aminobenzene or 4-aminoanthraquinone-2:1(N)-5'-chlorobenzacridone, with 1 molecular proportion or with 2 molecular proportions of a vattable amine of the formula $H_2N-R_1$.

The carbazolization of the compounds of the general Formula 3 can be carried out by methods in themselves known. As carbazolizing agent there comes into consideration advantageously aluminium chloride. In general it is advisable to use the aluminium chloride in the presence of nitrobenzene or advantageously with sodium chloride and/or sulfur dioxide as a fluxing agent. In some cases however, the carbazolization can be carried out very well by means of concentrated sulfuric acid or chlorosulfonic acid. This is the case especially with those condensation products of the Formula 3, in which R represents a diphenyl radical of which one benzene nucleus is bound to the quinazoline ring and the other benzene nucleus to

and in which $R_1$ represents an α-aroylamino-anthraquinone radical bound in the α-position to the —NH— group. In some cases it is of advantage to subject the carbazolized products to an after-oxidation, for example, with sodium bichromate in dilute sulfuric acid.

Among the vat dyestuffs of the anthraquinone series there are known products which contain the phthaloyl-quinazoline radical and which are obtained by condensing a 2-aryl-4-halogen-6:7-phthaloyl-quinazoline with a primary amine, for example, an aminoanthraquinone-benzacridone. As compared with these known products, the new compounds of the Formulas 3 and 4 represent a valuable enrichment of the hitherto known art. It is unexpected, on the one hand, that the halogen atom present in the radical R of the compounds of the Formula 5 used as starting materials in the present process would be so reactive as to enable a further vattable radical to be introduced at this position in the dyestuff molecule and, on the other that new dyestuffs having especially valuable properties would be obtained in this manner.

The new vattable dyestuffs of the Formula 3 obtainable by the process of the invention, and especially those of the Formula 4, can be used as pigment dyestuffs or for dyeing or printing a very wide variety of fibers such as linen, cotton, and artificial silk or staple fibers of regenerated cellulose, by the usual dyeing or printing methods. In many cases there are obtained from cold and hot vats practically the same tints and as a rule the dyeings, which have good general properties of fastness, are especially distinguished by their good fastness to spotting with water and fastness to chlorine, kier-boiling and ironing. The new dyestuffs can be converted by methods in themselves known into leuco-preparations, especially sulfuric acid ester salts, and used for dyeing and printing by methods in themselves known for this class of dyestuffs.

The method of preparing 2-halogen-aryl-4-chloro-6:7-phthaloyl-quinazolines is exemplified below with reference to 2-(3' - bromophenyl)-4-chloro-6:7-phthaloyl-quinazoline:

120 parts of 2-amino-3-bromoanthraquinone, 105.2 parts of meta-bromobenzoyl chloride and 1440 parts of nitrobenzene are heated at the boil for ¼ hour. After cooling, the mixture is filtered, the filter residue is washed first with nitrobenzene and then with alcohol, and dried. 2-(3'-bromobenzoyl)-amino-3-bromanthraquinone is obtained in good yield in the form of greenish lamellae.

194 parts of the product so obtained are heated with 48 parts of cuprous cyanide, 48 parts of a commercial mixture of β- and γ-picoline and 2400 parts of nitrobenzene for ½ hour at 180–185° C. After cooling, the mixture is filtered, and the filter residue is washed with nitrobenzene, then with alcohol and finally with water. The crude product is then suspended in warm nitric acid of 20 percent strength in order to remove the copper compounds, the mixture is then filtered, and the filter residue is washed with water and dried. In this manner 2-(3'-bromobenzoyl)-aminoanthraquinone-3-nitrile is obtained in good yield in the form of yellowish lamellae.

163 parts of the product so obtained are heated together with 157.5 parts of phosphorus pentachloride and 590 parts of nitrobenzene for 1½ hours at 135–140° C. After cooling, the mixture is filtered, and the filter residue is washed with nitrobenzene, then with benzene and dried. 2-(3'-bromophenyl)-4-chloro-6:7-phthaloyl-quinazoline is obtained in good yield in the form of a brownish product.

In an exactly analogous manner there are obtained good yields of the following compounds used in the examples given below:

2 - (4' - bromophenyl) - 4 - chloro - 6:7 - phthaloyl-quinazoline and 2-[4''-bromo-diphenyl-(1')]-4-chloro-6:7-phthaloyl-quinazoline. There are also obtained the compounds 2-(2'-chlorophenyl)-4-chloro-6:7-phthaloyl-quinazoline and 2-[2'-chloronaphthyl-(3')]-4-chloro-6:7-phthaloyl-quinazoline.

The following examples illustrate the invention, the parts and percentages being by weight unless otherwise stated and the relationship of parts by weight to parts by volume being the same as that of the kilogram to the liter:

Example 1

2 parts of the product of the formula (7)

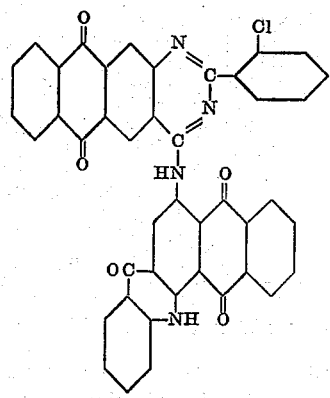

1 part of 1-amino-4-benzoylamino-anthraquinone, 0.5 part of anhydrous sodium acetate, 0.5 part of anhydrous sodium carbonate and 0.1 part of anhydrous cupric acetate are suspended in 480 parts of nitrobenzene and the whole is heated at the boil for 7 hours. After cooling, the mixture is filtered with suction, and the filter residue is washed with nitrobenzene, and then alcohol. In order to remove copper salts the blue-green condensation product is extracted at the boil with dilute hydrochloric acid, then the mixture is filtered with suction, and the filter residue is washed with water and dried. There is obtained in good yield the anthrimide of the formula (8)

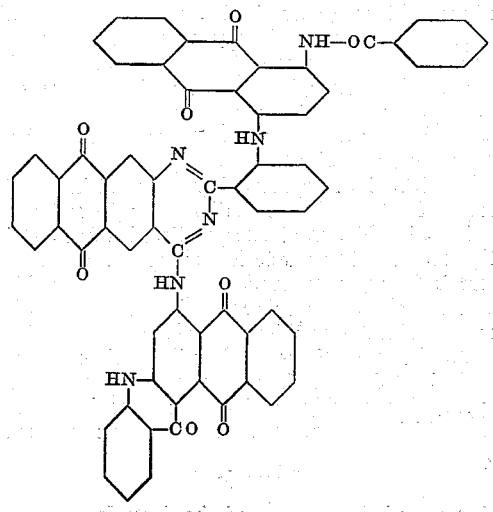

30 parts of anhydrous aluminium chloride and 6 parts of sodium chloride are mixed together, and the mixture is fluxed by introducing sulfur dioxide gas. There is added to the melt 1 part of the anthrimide of Formula 8 prepared as described in the preceding paragraph, and the whole is heated for one hour at 95–100° C. and then poured on to ice. After decomposing the aluminium chloride complex, the mixture is filtered with suction, washed with water, and the filter cake is suspended in water, and after the addition of a small amount of dilute sulfuric acid and 0.3 part of sodium bichromate, the whole is stirred for several hours at room temperature. After filtering with suction, washing the filter residue with water and drying it, there is obtained the dyestuff corresponding to the Formula 2 given above, in the form of a black-green powder which dyes cotton from a brown-red vat olive-green tints having remarkable properties of fastness.

The product of the Formula 7, which is used above, is prepared as follows:

10 parts of the 2-(2'-chlorophenyl)-4-chloro-6:7-phthaloyl-quinazoline of the formula (9)

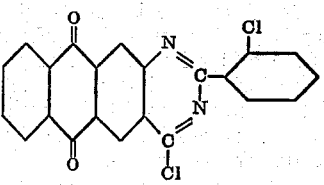

prepared in the manner hereinbefore described from 2 - (orthochlorobenzoylamine) - anthraquinone - 3 - nitrile by the action of phosphorus pentachloride, are heated with 6.6 parts of 4-amino-2:1(N)-anthraquinone-benzacridone and 200 parts of phenol for ¼ hour at the boil. The whole is cooled to about 50° C., 200 parts of pyridine are added, and the mixture is filtered with suction. The filter cake is washed with alcohol and dried. The crude product can be purified by fractional precipitation from sulfuric acid. It is a green product.

Example 2

3 parts of the product of the Formula 7 given in Example 1, 1.5 parts of 1-amino-5-benzoylaminoanthraquinone, 0.6 part of anhydrous sodium carbonate, 0.6 part of anhydrous sodium acetate, 0.1 part of anhydrous cupric acetate and 480 parts of nitrobenzene are heated together for 7 hours at the boil. After cooling, the mixture is filtered, the filter residue is washed with nitrobenzene and then alcohol, and dried. A dark green powder is obtained in good yield.

2 parts of this product are introduced into a mixture, fluxed with sulfur dioxide, of 60 parts of anhydrous aluminium chloride and 12 parts of sodium chloride, while stirring. The whole is heated for 1 hour at 95–100° C., and then poured on to ice. After filtering with suction and washing the filter residue with water, the residue is suspended in water, acidified with a small amount of dilute sulfuric acid, and then 0.6 part of sodium bichromate is added and the whole is stirred for several hours at room temperature. The whole is then filtered, and the filter residue is washed and dried. There is obtained a black green powder which dyes cotton from a red-brown vat fast olive-green tints.

Example 3

2 parts of the product of the formula (10)

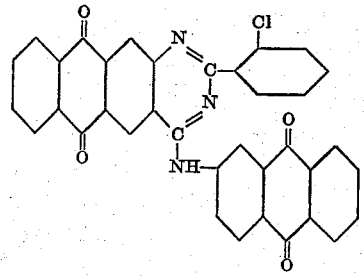

prepared in the manner described in Example 1 from 2-(2'-chlorophenyl)-4-chloro-6:7-phthaloyl-quinazoline of the Formula 9 and 2-aminoanthraquinone, are heated with 1 part of 1-amino-4-benzoylaminoanthraquinone, 0.5 part of anhydrous sodium acetate, 0.5 part of anhydrous sodium carbonate and 0.1 part of cupric acetate in 84 parts of nitrobenzene at the boil for 7 hours. After cooling, the whole is filtered, and the filter residue is washed first with nitrobenzene and then with alcohol and dried. There is obtained a dark brown anthrimide.

1 part of the anthrimide obtained as described above is introduced into a mixture fluxed with sulfur dioxide of 30 parts of anhydrous aluminium chloride and 6 parts of sodium chloride. The whole is heated while stirring for one hour at 95–100° C., then poured on to ice, and the mixture is filtered and the filter residue is washed with water. The filter cake is suspended in water, the suspension is mixed, after the addition of a small amount of dilute sulfuric acid, with 0.3 part of sodium bichromate and stirred for several hours at room temperature. The whole is then filtered and the filter residue is washed and dried. There is obtained a dark brown product which dyes cotton from a violet-brown vat khaki brown tints.

*Example 4*

8.1 parts of 2-(2'-chlorophenyl)-4-chloro-6:7-phthaloyl-quinazoline of the Formula 9 are heated with 6.8 parts of 1-amino-5-benzoylaminoanthraquinone and 160 parts of phenol for ¼ hour at the boil. 160 parts of pyridine are then added, the whole is filtered with suction while hot, and the filter residue is washed with alcohol. After drying there is obtained an orange powder corresponding to the formula (11)

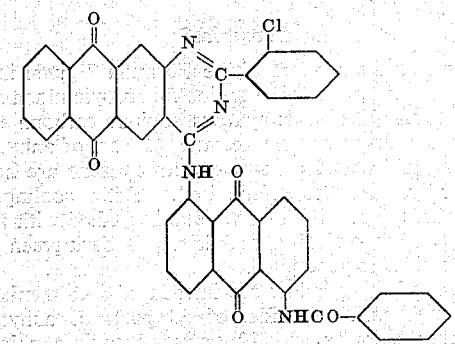

3 parts of this product, 1.5 parts of 1-amino-5-benzoylaminoanthraquinone, 0.5 part of anhydrous sodium carbonate, 0.5 part of anhydrous sodium acetate, 0.2 part of anhydrous cupric acetate and 70 parts of nitrobenzene are heated at the boil for 7 hours. After cooling, the whole is filtered with suction and the filtered residue is washed with nitrobenzene and then with alcohol, and then the product is extracted at the boil with dilute hydrochloric acid, the mixture is filtered, and the filter residue is washed with water and dried. The resulting dark product corresponds to the formula (12)

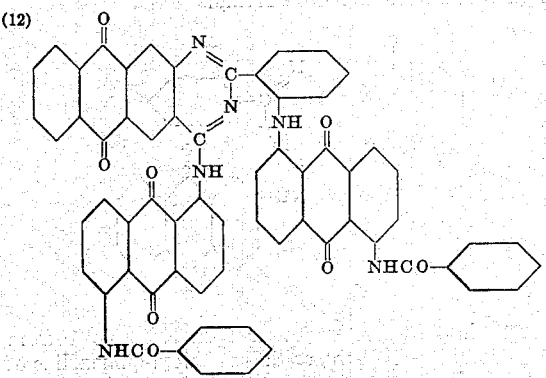

1 part of the latter product is introduced while stirring into a mixture fluxed with sulfur dioxide of 30 parts of anhydrous aluminium chloride and 6 parts of sodium chloride. After heating for 1 hour at 95–100° C., the whole is introduced on to ice, and the mixture is filtered with suction and the filter residue is washed with dilute hydrochloric acid, and then suspended in water and, after the addition of a small amount of dilute sulfuric acid and 0.3 part of sodium bichromate, is stirred for several hours at room temperature. After filtration, washing and drying, there is obtained in the form of a brown powder a dyestuff which probably corresponds to the formula (13)

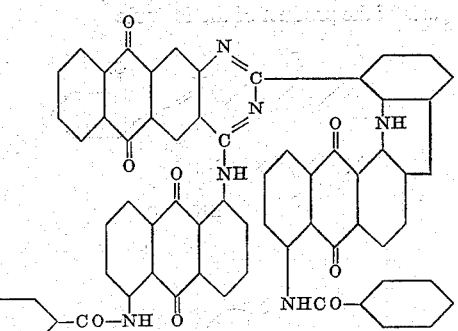

and which dyes cotton from a red-brown vat yellow-brown tints.

By reacting the reaction product of 2-(2'-chlorophenyl)-4-chloro-6:7-phthaloyl-quinazoline and 1-amino-5-benzoylaminoanthraquinone described at the beginning of this example in the manner described in the second paragraph with 1-amino-4-benzoylaminoanthraquinone, instead of 1-amino-5-benzoylaminoanthraquinone, there is likewise obtained a dark colored product. By treating the latter product with aluminium chloride in the manner described in the third paragraph, there is obtained a dyestuff which dyes cotton from a red-brown vat yellow brown tints.

*Example 5*

2.5 parts of the condensation product described in Example 1 from 2-(2'-chlorophenyl)-4-chloro-6:7-phthaloyl-quinazoline and 4-amino-2:1(N)-anthraquinone-benzacridone (Formula 7), 0.8 part of 1-aminoanthraquinone, 0.4 part of anhydrous sodium carbonate, 0.4 part of anhydrous sodium acetate, 0.2 part of anhydrous cupric acetate and 70 parts of nitrobenzene are heated at the boil for 7 hours. After cooling, the product is worked up in the manner repeatedly described, whereby a dark product is obtained.

1 part of the latter product is introduced in a melt of 30 parts of anhydrous aluminium chloride and 6 parts of sodium chloride, and heated while stirring for 1 hour at 150–155° C. The whole is then poured onto ice, the mixture is filtered with suction, and the filter residue is washed with water and suspended in a fresh quantity of water, and after the addition of a small amount of dilute sulfuric acid and 0.3 part of sodium bichromate, the whole is heated for a few hours at room temperature. After filtration, washing and drying there is obtained a dyestuff which dyes cotton from a Bordeaux-red vat olive tints.

*Example 6*

2.1 parts of the product of the formula (14)

1 part of 1-amino-4-benzoylaminoanthraquinone, 0.4 part of anhydrous sodium carbonate, 0.4 part of anhydrous sodium acetate and 0.1 part of anhydrous cupric acetate and 80 parts of nitrobenzene are heated at the boil for 7 hours. After cooling, the mixture is filtered with suction, the filter residue is washed with nitrobenzene and then with alcohol and worked up in the usual manner. After drying a black-green product is obtained.

1 part of the latter product is introduced into a melt fluxed with sulfur dioxide of 30 parts of anhydrous aluminium chloride and 6 parts of sodium chloride and the whole is heated at 95–100° C. The mixture is then poured on to ice and after-oxidized in the usual manner with 0.3 part of sodium bichromate. The dyestuff so obtained dyes cotton from a Bordeaux-red vat olive tints.

The above mentioned product of the Formula 14 is prepared as follows:

3.5 parts of the quinazoline derivative of the formula (15)

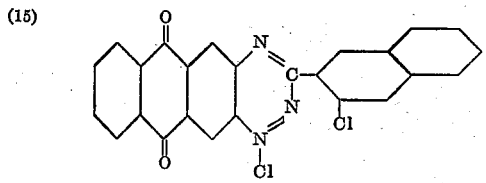

prepared as described in the opening part of this specification from 2-(3'-chloro-2'-naphthoylamino)-anthraquinone-3-nitrile by the action of phosphorous pentachloride, are heated with 2.5 parts of 4-amino-2:1(N)-anthraquinone-benzacridone, 7 parts of phenol and 42 parts of nitrobenzene are heated at the boil for ½ hour. After the addition of 7 parts of pyridine, the whole is filtered with suction while hot and the filter residue is washed with alcohol. The crude product can then be purified by fractional precipitation from sulfuric acid. It dyes cotton from a red-violet vat fast green tints.

*Example 7*

8 parts of 2-(3'-bromophenyl)-4-chloro-6:7-phthaloyl-quinazoline of the formula
(16)

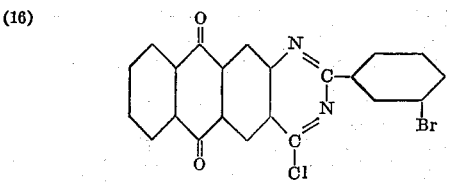

6.1 parts of 1-amino-5-benzoylaminoanthraquinone, 15 parts of phenol and 80 parts of nitrobenzene are heated at the boil for ½ hour.

15 parts of pyridine are then added, and the mixture is filtered with suction and the filter residue is washed with alcohol. There is obtained an orange product which corresponds to the formula
(17)

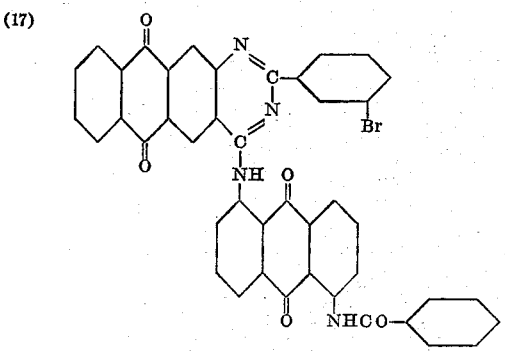

3 parts of this product, 1.4 parts of 1-amino-5-benzoylaminoanthraquinone, 0.6 part of potassium carbonate, 0.6 part of potassium acetate 0.2 part of cupric acetate and 300 parts of naphthalene are heated at the boil for 22 hours. The product is worked up in the usual manner and there is obtained a brown condensation product.

1 part of the latter condensation product is heated in a melt fluxed with sulfur dioxide of 30 parts of aluminium chloride and 6 parts of sodium chloride for 1 hour at 95–100° C. After oxidation with sodium bichromate there is obtained a dyestuff which dyes cotton from an orange-brown vat pure red-brown tints.

*Example 8*

7.5 parts of the condensation product of the formula (18)

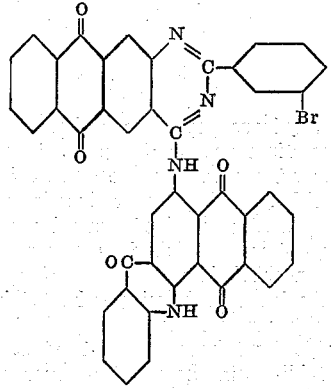

(obtainable by the condensation of 2-(3'-bromophenyl)-4-chloro-6:7-phthaloyl-quinazoline with 4-amino-2:1(N)-anthraquinone-benzacridone), 3.8 parts of 1-amino-5-benzoylamino-anthraquinone, 1.5 parts of anhydrous potassium carbonate, 1.5 parts anhydrous potassium acetate, 0.3 part of anhydrous cupric acetate and 600 parts of naphthalene are heated at the boil for 22 hours. The reaction mass, after cooling somewhat, is diluted with chlorobenzene, then filtered with suction, and the filter residue is washed with benzene and then purified in the manner repeatedly described. There is obtained an olive colored product.

1 part of the anthrimide so obtained is heated in a melt, fluxed with sulfur dioxide and consisting of 30 parts of aluminium chloride and 6 parts of sodium chloride, for 1 hour at 95–100° C. The product is then after-oxidized with 0.3 part of sodium bichromate in the manner repeatedly described and then worked up. There is obtained a dyestuff which dyes cotton from a violet-brown vat fast khaki tints.

By condensing the condensation product of the Formula 18 with 1-amino-4-benzoylamino-anthraquinone, instead of 1-amino-5-benzoylamino-anthraquinone, there is obtained a black-green anthrimide. By carbazolizing the latter in the manner described in the second paragraph of this example there is obtained a dyestuff which dyes cotton from a red-brown vat greenish olive tints.

By condensing the condensation product of the Formula 18 with the corresponding quantity of 1-aminoanthraquinone, instead of 1-amino-5-benzoylaminoanthraquinone, there is obtained a green-black anthrimide which dyes cotton from a red-brown vat fast olive tints. 1 part of the anthrimide is heated in a melt of 30 parts of aluminium chloride and 6 parts of sodium chloride for 1 hour at 160–165° C. The product is then after-oxidized with sodium bichromate in the manner repeatedly described, whereby there is obtained a dyestuff which dyes cotton from a red-brown vat khaki tints.

In an exactly analogous manner there is obtained by condensing the intermediate product of the Formula 18 with the corresponding quantity of 1-amino-4-methoxyanthraquinone, a black-green anthrimide which dyes cotton from a red-brown vat bottle green tints. By subjecting the anthrimide to fusion with aluminium chloride and sodium chloride at 160° C. or to fusion with aluminium chloride and sulfur dioxide at 100° C., there are obtained dyestuffs which dye cotton from red-brown vats khaki tints.

*Example 9*

3 parts of the condensation product of the Formula 18 in Example 8, obtained from 2-(3'-bromophenyl)-4- chloro-6:7-phthaloyl-quinazoline and 4-amino-2:1(N)-anthraquinone-benzacridone, 1 part of 4-amino-1:9-isothiazole-anthrone of the formula (19)

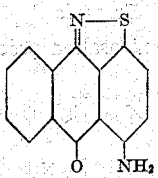

0.6 part of anhydrous potassium carbonate, 0.6 part of anhydrous potassium acetate, 0.2 part of cupric acetate and 300 parts of naphthalene are heated for 22 hours at the boil. After cooling the product is worked up in the manner repeatedly described, whereby an olive-black anthrimide is obtained which dyes cotton from a red-brown vat green-khaki tints.

1 part of the latter anthrimide is heated in a melt of 30 parts of anhydrous aluminium chloride and 6 parts of sodium chloride for 1 hour at 160–165° C. The product is after-oxidized in the usual manner with sodium bichromate, whereby a dyestuff is obtained which dyes cotton from a red-brown vat fast olive tints.

By using in the first paragraph of this example 5-amino-1:9-isothiazole-anthorone, instead of 4-amino-1:9-isothiazole-anthrone, there is obtained an anthrimide which dyes cotton from a red-brown vat greenish olive tints. By subjecting this anthrimide to fusion with aluminium chloride and sulfur dioxide at 100° C. in the manner repeatedly described, there is obtained a dyestuff which dyes cotton from a red-brown vat brown-olive tints.

Example 10

7.5 parts of the condensation product of the Formula 18 mentioned in Example 8, and obtained from 2-(3'-bromophenyl)-4-chloro-6:7-phthaloyl-quinazoline and 4-amino-2:1-(N)-anthraquinonebenzacridone, 4.7 parts of amino-dibenzanthrone, 1.5 parts of potassium carbonate, 1.5 parts of potassium acetate, 0.3 part of cupric acetate and 600 parts of naphthalene are heated for 22 hours at the boil. After cooling the mixture the product is worked up in the usual manner. There is obtained a black-green powder which dyes cotton from a violet vat powerful greenish olive tints having good properties of fastness.

By treatment with an aluminium chloride-sodium chloride melt at 160° C. there is obtained a dyestuff which dyes cotton from a blue-violet vat powerful grey tints having an olive shade.

By treatment in an aluminium chloride-sodium chloride melt fluxed with sulfur dioxide at 100° C., there is obtained a dyestuff which dyes cotton from a black-blue vat powerful greenish olive tints.

Example 11

8 parts of 2-(3'-bromophenyl)-4-chloro-6:8-phthaloyl-quinazoline of the Formula 16, 4 parts of 2-amino-anthraquinone, 15 parts of phenol and 80 parts of nitrobenzene are heated for ½ hour at the boil. There are then added 15 parts of pyridine, the mixture is filtered with suction, and the filter residue is washed with alcohol. In this manner there is obtained a brown product corresponding to the formula (20)

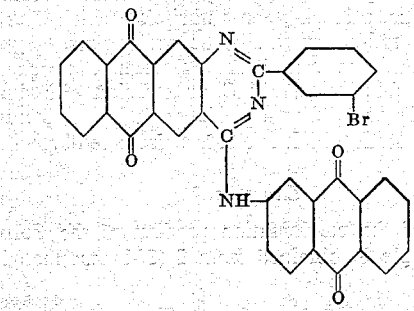

3 parts of the above condensation product, 1.7 parts of 1-amino-5-benzoylamino-anthraquinone, 0.6 part of potassium carbonate and 0.6 part of potassium acetate, 0.2 part of cupric acetate and 300 parts of naphthalene are heated at the boil for 22 hours. The product is worked up in the usual manner and there is obtained a dark brown powder.

1 part of the powder is heated in a melt fluxed with sulfur dioxide and consisting of 30 parts of aluminium chloride and 6 parts of sodium chloride for 1 hour at 95–100° C. By after-treatment with sodium bichromate in the manner repeatedly described there is obtained a dyestuff which dyes cotton from a red-brown vat fast red-brown tints.

Example 12

5 parts of 2-(3'-bromophenyl)-4-chloro-6:7-phthaloyl-quinazoline of the formula (16), 4.3 parts of 4-amino-2:1(N)-1':2'(N)-anthraquinone-naphthacridone of the formula (21)

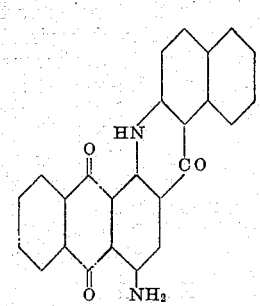

16.8 parts of phenol and 60 parts of nitrobenzene are heated for ½ hour at the boil. After the addition of 16.8 parts of pyridine the mixture is filtered with suction and the filter residue is washed with alcohol. After drying there is obtained a dark green product.

3 parts of the condensation product described above, 1.4 parts of 1-amino-5-benzoylamino- anthraquinone, 0.5 part of potassium carbonate, 0.5 part of potassium acetate, 0.2 part of cupric acetate and 300 parts of naphthalene are heated at the boil for 22 hours. The product is then worked up in the usual manner and there is obtained a black-olive anthrimide which dyes cotton from a red-brown vat greenish olive tints.

1 part of the latter anthrimide is heated for 1 hour at 95–100° C. in a melt fluxed with sulfur dioxide and consisting of 30 parts of aluminum chloride and 6 parts of sodium chloride. By after-treatment with sodium bichromate in the manner repeatedly described there is obtained a dyestuff which dyes cotton from a red-brown vat fast, strong khaki tints.

By placing the 1-amino-5-benzoylamino-anthraquinone used in the anthrimide condensation described in the second paragraph of this example by the same quantity of 1-amino-4-benzoylamino-anthraquinone, there is obtained an olive anthrimide which dyes cotton from a red-brown vat greenish olive tints.

1 part of the latter anthrimide is heated for 1 hour at 95–100° C. in a melt fluxed with sulfur dioxide and consisting of 30 parts of aluminum chloride and 6 parts of sodium chloride, and then the product is after-treated with sodium bichromate in the manner repeatedly described. There is obtained a dyestuff which dyes cotton from a red-brown vat green-olive tints.

Example 13

5 parts of 2-(3'-bromophenyl)-4-chloro-6:7-phthaloyl-quinazoline of the formula (16), 4.8 parts of 4-amino- 2:1(N)-1':2'(N) - 3' - phenoxy - anthraquinone - benzacridone of the formula

(22)
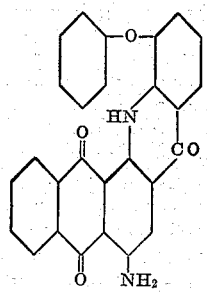

16.8 parts of phenol and 60 parts of nitrobenzene are heated at the boil for ½ hour. After the addition of 16.8 parts of pyridine, the mixture is filtered, and the filter residue is washed with alcohol. After drying there is obtained a dark green product.

3 parts of the condensation product so obtained, 1.3 parts of 1-amino-4-benzoylamino-anthraquinone, 0.5 part of potassium carbonate, 0.5 part of potassium acetate, 0.2 part of cupric acetate and 300 parts of naphthalene are heated at the boil for 22 hours. After cooling, the product is worked up in the usual manner. There is obtained a black-green product which dyes cotton from a red-brown vat greenish olive tints.

1 part of the latter anthrimide is heated for 1 hour at 160–165° C. in a melt of 30 parts of aluminum chloride and 6 parts of sodium chloride, and then after-treated with sodium bichromate in the manner repeatedly described. In this manner there is obtained a dyestuff which dyes cotton from a red-brown vat fast khaki tints.

By replacing the 1-amino-4-benzoylamino-anthraquinone used in the anthrimide condensation described in the second paragraph of this example by 1-amino-5-benzoylamino-anthraquinone, there is obtained an olive-green product which dyes cotton from a red-brown vat olive tints.

By treating the latter product at 100° C. in a melt of aluminum chloride, sodium chloride and sulfur dioxide followed by oxidation with sodium bichromate, there is obtained a dyestuff which dyes cotton from a red-brown vat fast khaki tints.

*Example 14*

7.5 parts of the condensation product of the Formula 18 described in Example 8, and obtained from 1 mol of 2-(3'-bromophenyl)-4-chloro - 6:7 - phthaloylquinazoline and 4-amino-2:1(N)-anthraquinone-benzacridone, 3.5 parts of 4-amino-2:1(N)-anthraquinone-benzacridone, 1.5 parts of potassium carbonate, 1.5 parts of potassium acetate, 0.3 part of cupric acetate and 600 parts of naphthalene are heated at the boil for 16 hours. The product is worked up in the usual manner, and there is obtained a dark green product corresponding to the formula

(23)
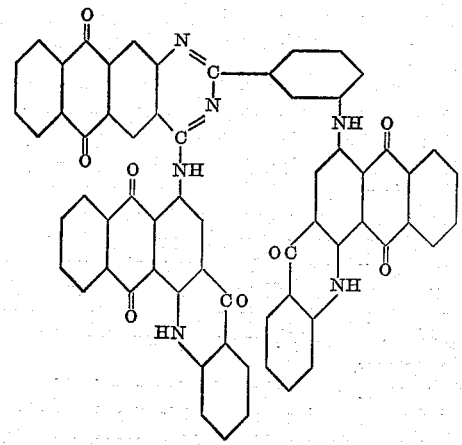

which dyes cotton from a violet-brown vat greenish olive tints.

The product can also be obtained by reacting directly 1 mol of 2-(3'-bromophenyl)-4-chloro-6:7-phthaloylquinazoline with 2 mols of 4-amino-2:1(N)-anthraquinone-benzacridone in nitrobenzene.

18 parts of this anthrimide are heated for 1 hour at 95–100° C. in a melt fluxed with sulfur dioxide and consisting of 90 parts of anhydrous aluminum chloride and 18 parts of sodium chloride. The whole is poured on to ice, then acidified with some dilute hydrochloric acid, filtered, and the filter residue is washed with water. The residue is suspended in water, then acidified with some dilute sulfuric acid and after the addition of 1.2 parts of crystalline sodium bichromate the whole is stirred for 5 hours at room temperature. The whole is then filtered with suction, and the filter residue is washed with water and is either made up into a paste or evaporated to dryness depending on the purpose for which it is to be used. The dyestuff dyes from a cold or hot bordeaux-colored vat in practically the same fast, strong olive tints having remarkable fastness properties especially to spotting with water. The product is also suitable for the printing of vegetable fibers, especially cotton.

By reacting 2-(3'-bromophenyl)-4-chloro-6:7-phthaloyl-quinazoline with 4-amino-5'-chloro-2:1(N)-anthraquinone-benzacridone, and subsequently further condensing with 1 mol of 1-amino-4-benzoylamino-anthraquinone, there is obtained a black-green product, which after being carbazolized in the usual manner with an aluminum chloride-sulfur dioxide melt yields a dyestuff which dyes cotton from a red-brown vat olive tints.

The reaction product of 1 mol of 2-(3'-bromophenyl)-4-chloro-6:7-phthaloyl-quinazoline and 1 mol of 5'-chloro-4-amino-2:-(N)-anthraquinone-benzacridone may also be reacted with 2 mols of 1-amino-4-benzoylamino-anthraquinone. In this manner there is obtained a dark product which, after carbazolization by means of an aluminum chloride-sodium chloride-sulfur dioxide melt yields a dyestuff which dyes cotton from a red-brown vat olive tints.

*Example 15*

7.5 parts of the reaction product of the Formula 18 described in Example 8, and obtained from 1 mol of 2 - (3' - bromophenyl) - 4 - chloro - 6:7 - phthaloyl-quinazoline and 4-amino-2:1(N)-anthraquinone-benzacridone, 4.5 parts of 5-amino-1:1'-dianthramide of the formula

(24)
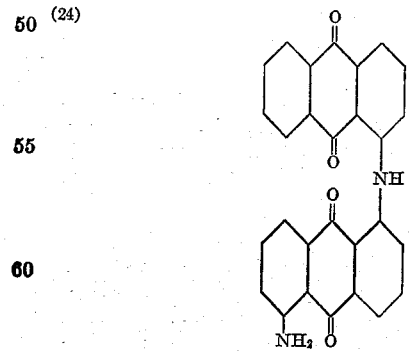

1.5 parts of potassium carbonate, 1.5 parts of potassium acetate, 0.3 part of cupric acetate and 600 parts of naphthalene are heated for 22 hours at the boil. After working up in the usual manner there is obtained a dark product which dyes cotton from a red-brown vat olive-green tints.

By carbazolizing the latter product at 100° C. with an aluminum chloride-sodium chloride-sulfur dioxide melt in the manner repeatedly described and after-oxidizing with sodium bichromate, there is obtained a dyestuff which dyes cotton from a red-brown vat fast olive-green tints. By carrying out the carbazolization in an aluminum chloride-sodium chloride melt at 160–165° C. there is obtained a dyestuff which dyes cotton from a red-brown vat brown-khaki tints.

By using in the manner described in the first paragraph of this example, instead of the 5-amino- the same quantity of 4-amino-1:1'-dianthrimide of the formula

(25)
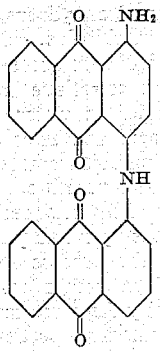

there is obtained an olive-green product which dyes cotton from a red-brown vat olive-green tints. By carbazolization there is likewise obtained a dyestuff which dyes olive-green tints from a red-brown vat.

Example 16

4.5 parts of 2-(3'-bromophenyl)-4-chloro-6:7-phthaloyl-quinazoline, 2.4 parts of 3-amino-pyrene, 7 parts of phenyl and 40 parts of nitrobenzene are heated for ½ hour at the boil. 7 parts of pyridine are then added, the mixture is filtered with suction, and the filter residue is washed with water. After drying, there is obtained a brown product corresponding to the formula

(26)
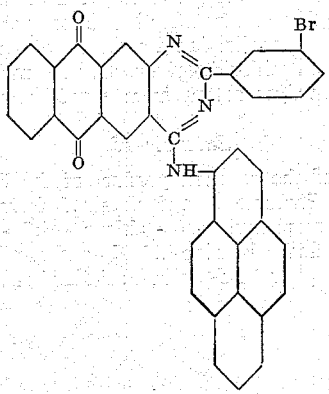

4 parts of the latter product, 2.3 parts of 1-amino-4-benzoylamino-anthraquinone, 0.8 part of potassium carbonate, 0.8 part of potassium acetate, 0.2 part of cupric acetate and 300 parts of naphthalene are heated at the boil for 22 hours. After cooling, the product is worked up in the usual manner. The dark brown product so obtained is carbazolized at 95–100° C. in an aluminum chloride-sodium chloride-sulfur dioxide melt and after-oxidized with sodium bichromate, whereby a dyestuff is obtained which dyes cotton from a red-brown vat brown tints.

Example 17

4 parts of 2-(3'-bromophenyl)-4-chloro-6:7-phthaloyl-quinazoline, 2 parts of aniline, 6.8 parts of phenol and 40 parts of nitrobenzene are heated at the boil for ½ hour. After the addition of 6.8 parts of pyridine, the mixture is filtered with suction and the filter residue is washed with alcohol. After drying there is obtained a brown powder.

2 parts of the product so obtained, 1.4 parts of 1-amino-5-benzoylamino-anthraquinone, 0.6 part of potassium carbonate, 0.6 part of potassium acetate, 0.2 part of cupric acetate and 60 parts of naphthalene are heated at the boil for 7 hours. After cooling, the mixture is filtered with suction and the product is worked up in the usual manner. There is obtained a black-brown product which, after being carbazolized at 100° C. with an aluminum chloride-sodium chloride-sulfur dioxide melt in the manner repeatedly described followed by after-oxidation with sodium bichromate, yields a dyestuff which dyes cotton from a red-brown vat fast red-brown tints.

By reacting 2-(2'-chlorophenyl)-4-chloro-6:7-phthaloyl-quinazoline with ortho-chloraniline there is obtained an orange intermediate product which can be reacted with 2 mols of 1-amino-5-benzoylamino-anthraquinone to form a dark brown anthrimide. After carbazolization with an aluminum chloride-sodium chloride-sulfur dioxide melt and after-oxidation with bichromate, there is obtained a dyestuff which dyes cotton from a red-brown vat brown tints.

Example 18

7.5 parts of the condensation product from 2-(4'-bromophenyl)-4-chloro-6:7-phthaloyl-quinazoline and 4-amino-2:1(N)-anthraquinone-benzacridone, 3.8 parts of 1-amino-4-benzoylamino-anthraquinone, 1.5 parts of potassium carbonate, 1.5 parts of potassium acetate, 1 part of cupric acetate, 1 part of copper powder and 600 parts of naphthalene are heated for 22 hours at the boil.

After working up there is obtained a dark powder which dyes cotton from a red-brown vat bottle green tints. After carbazolization with an aluminum chloride-sodium chloride-sulfur dioxide melt followed by oxidation with sodium bichromate, there is obtained a dyestuff which dyes cotton from a red-brown vat greenish olive tints.

By using in this example, instead of the 1-amino-4-benzoylamino-anthraquinone, the same quantity of 4-amino-2:1(N)-anthraquinone-benzacridone, there is obtained a dyestuff which dyes cotton from a red-brown vat olive green tints. By carbazolization there is obtained a dyestuff which also dyes cotton olive green tints.

Example 19

5 parts of the condensation product from 2-(4'-bromodiphenyl)-4-chloro-6:7-phthaloyl-quinazoline of the formula

(27)
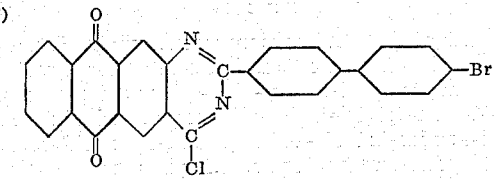

and 4-amino-2:1(N)-anthraquinone-benzacridone, 2.3 parts of 1-amino-5-benzoylamino-anthraquinone, 1 part of potassium carbonate, 1 part of potassium acetate, 0.5 part of cupric acetate and 500 parts of naphthalene are heated at the boil for 22 hours. After working up in the usual manner there is obtained a dark powder which dyes cotton from a red-brown vat green-olive tints of good fastness.

2 parts of the latter anthrimide are introduced into an aluminum chloride-sodium chloride melt fluxed with sulfur dioxide and heated for 1 hour at 95–100° C. The whole is poured on to ice, filtered with suction, and the filter residue is washed with water and suspended in water and then, after the addition of 0.3 part of crystalline sodium bichromate and a small amount of dilute sulfuric acid, the mixture is stirred for several hours at room temperature. It is then filtered, and the filter residue is washed and dried. There is obtained a dyestuff which dyes cotton from a red-brown vat green-olive tints of remarkable fastness.

Another method of carbazolization consists in stirring 1 part of the anthrimide described in the first paragraph in 10 parts of sulfuric acid of 100 percent. strength for several hours at room temperature. Ice is then added and 0.3 part of sodium bichromate, and the mixture is stirred for several hours at room temperature. The mixture is then filtered, and the filter residue is washed with water and dried. The dyestuff so obtained dyes cotton from a red-brown vat olive-green tints.

A further method of carbazolization consists in heating 1 part of the anthrimide described in the first paragraph with 16 parts of aluminum chloride and 30 parts of nitrobenzene for 1 hour at 50–55° C. The mixture is poured on to ice, the nitrobenzene is distilled off by means of steam, the residue is made up into a fine paste with water, and after the addition of a small amount of dilute sulfuric acid and 0.3 part of sodium bichromate, is stirred for several hours at room temperature. The mixture is then filtered, and the filter residue is washed and dried. There is obtained a dyestuff which dyes cotton from a red-brown vat olive-green tints.

Example 20

6 parts of the condensation product from 2-(4'-bromodiphenyl)-4-chloro-6:7-phthaloyl-quinazoline and 4-amino-2:1(N)-anthraquinone-benzacridone, 2.6 parts of 1-amino-4-benzoylamino-anthraquinone, 1 part of potassium carbonate, 1 part of potassium acetate, 0.3 part of cupric acetate and 600 parts of naphthalene are heated for 22 hours at the boil. After working up in the usual manner there is obtained an olive-green powder which dyes cotton from a red-brown vat olive-green tints.

By carbazolization with an aluminum chloride-sodium chloride-sulfur dioxide melt in the manner repeatedly described followed by oxidation with sodium bichromate, there is obtained a dyestuff which dyes cotton from a red-brown vat full olive-green tints of remarkable fastness.

Another method of carbazolization consists in stirring 1 part of the anthrimide obtained as described in the first paragraph for 16 hours in 10 parts of chlorosulfonic acid at room temperature. The solution is poured onto ice, filtered with suction, and the filter residue is washed and again suspended, acidified slightly and, after the addition of 0.3 part of sodium bichromate, stirred for several hours at room temperature. After filtering, washing and drying there is obtained a dyestuff which dyes cotton from a red-brown vat olive-green tints.

Example 21

1 part of the dyestuff corresponding to the Formula 2 obtainable as described in Example 1 is vatted in 100 parts of water with the addition of 4 parts by volume of sodium hydroxide solution of 30 percent. strength and 2 parts of sodium hydrosulfite at about 50° C. The stock vat so obtained is added to a dyebath consisting of 3000 parts of water, 8 parts of sodium hydroxide solution of 30 percent. strength and 3 parts of sodium hydrosulfite, and 100 parts of cotton are entered at 40° C. After 15 minutes there are added 45 parts of sodium chloride and dyeing is carried on for 1 hour at 40–50° C. The cotton is then squeezed, oxidized in the air, rinsed in the cold, acidified, again rinsed and soaped at the boil. It is dyed an olive tint, and the dyeing is distinguished by a very good fastness to chlorine and kier-boiling.

What is claimed is:

1. A vat dyestuff corresponding to the formula

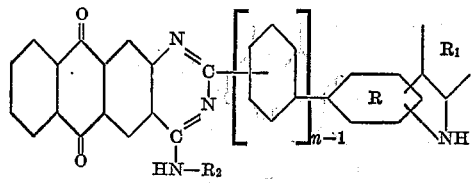

in which $n$ represents a whole number not greater than 2, $R_1$ represents an anthraquinonyl radical bound to the —NH— group by a ring carbon atom which is in a position vicinal to the carbon atom bound directly to the ring R, and $R_2$ represents an anthraquinone radical.

2. A vat dyestuff coresponding to the formula

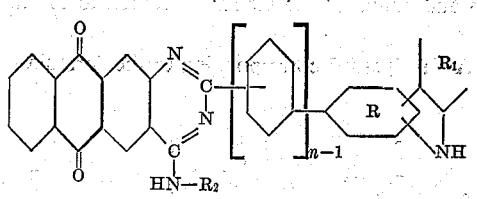

in which $n$ represents a whole number not greater than 2, $R_1$ represents an anthraquinonyl radical bound to the —NH— group by a ring carbon atom which is in a position vicinal to the carbon atom bound directly to the ring R, and $R_2$ represents the radical of an anthraquinone-2:1(N)-benzacridone bound in an α-position to the —NH— group.

3. A vat dyestuff corresponding to the formula

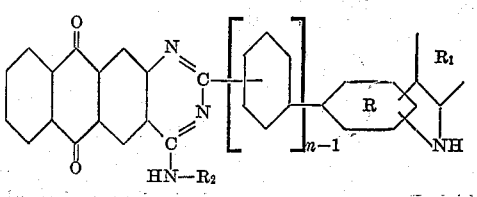

in which $n$ represents a whole number not greater than 2, $R_1$ represents a 1-benzoylamino-anthraquinone radical bound in one of the positions 4 and 5 to the —NH— group and bound in the vicinal β-position to the ring R, and $R_2$ represents the radical of an anthraquinone-2:1(N)-benzacridone bound in an α-position to the —NH— group.

4. A vat dyestuff corresponding to the formula

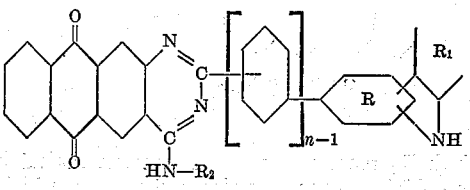

in which $n$ represents a whole number not greater than 2, $R_1$ represents the radical of an anthraquinone-2:1(N)-benzacridone bound in an α-position to the —NH— group and bound in the vicinal β-position to the ring R, and $R_2$ represents the radical of an anthraquinone-2:1(N)-benzacridone bound in an α-position to the —NH— group.

5. A vat dyestuff corresponding to the formula

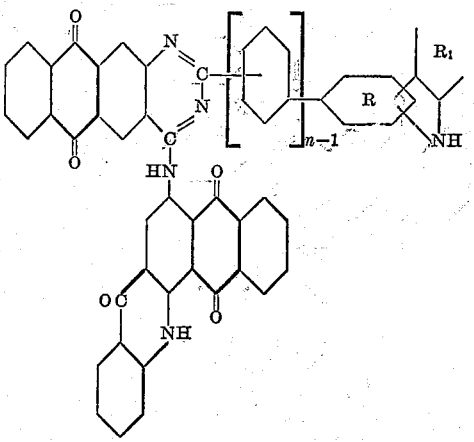

in which $n$ represents a whole number not greater than 2, and $R_1$ represents a 1-benzoylamino-anthraquinone radical bound in one of the positions 4 and 5 to the —NH— group and bound in the vicinal β-position to the ring R.

6. A vat dyestuff corresponding to the formula

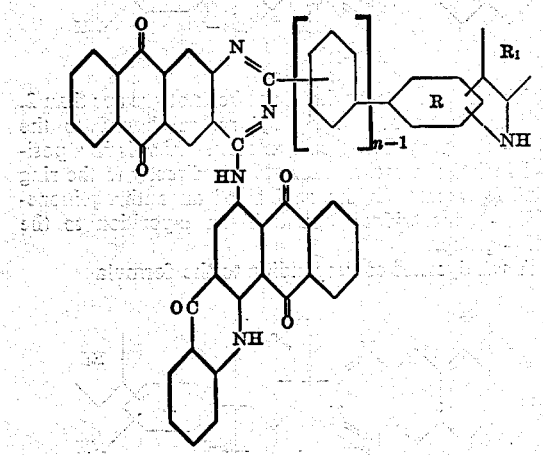

in which $R_1$ represents the radical of an anthraquinone-2:1(N)-benzacridone bound in an α-position to the —NH— group and bound in the vicinal β-position to R.

7. A vat dyestuff corresponding to the formula

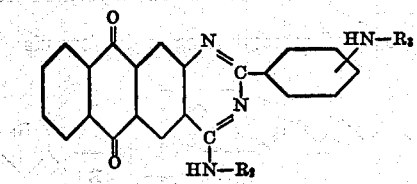

in which $R_3$ represents a dibenzanthrone radical bound to the —NH— group by a ring carbon atom which is in a position vicinal to a carbon atom bound to hydrogen, and $R_2$ represents the radical of an anthraquinone-2:1(N)-benzacridone bound in an α-position to the —NH— group.

8. The anthraquinone vat dyestuff of the formula

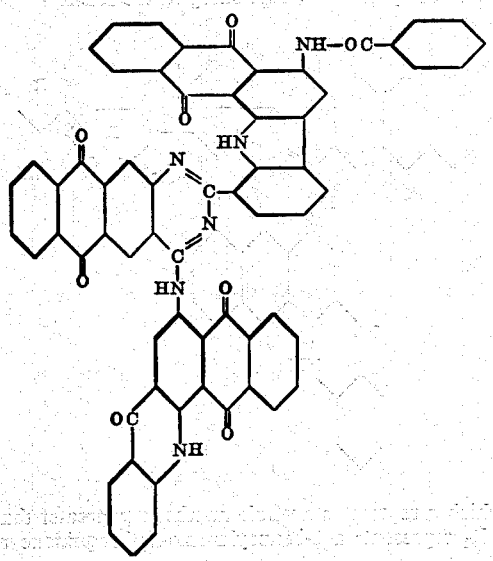

9. An anthraquinone vat dyestuff of the formula

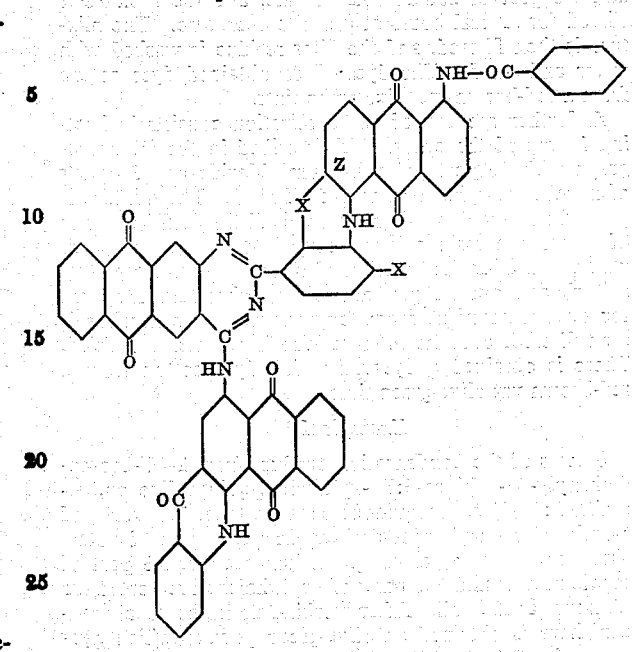

wherein one X represents a hydrogen atom and the other X represents a direct link with the carbon atom marked Z.

10. An anthraquinone vat dyestuff of the formula

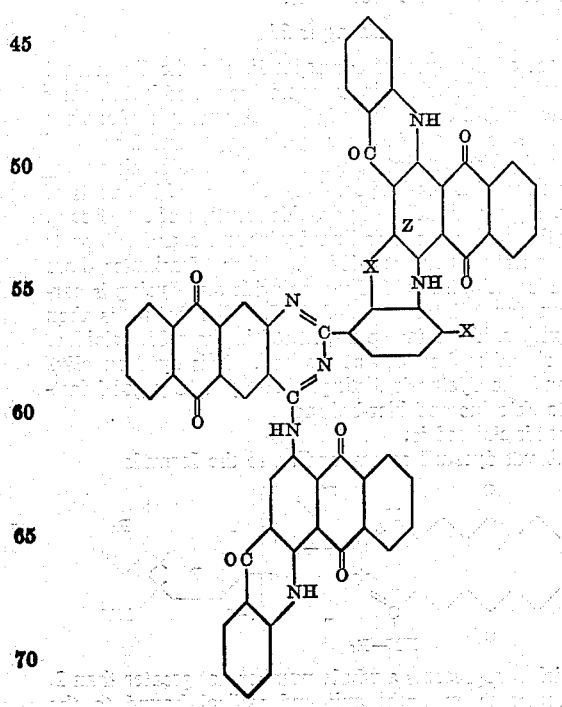

wherein one X represents a hydrogen atom and the other X represents a direct link with the carbon atom marked Z.

11. The anthraquinone vat dyestuff of the formula
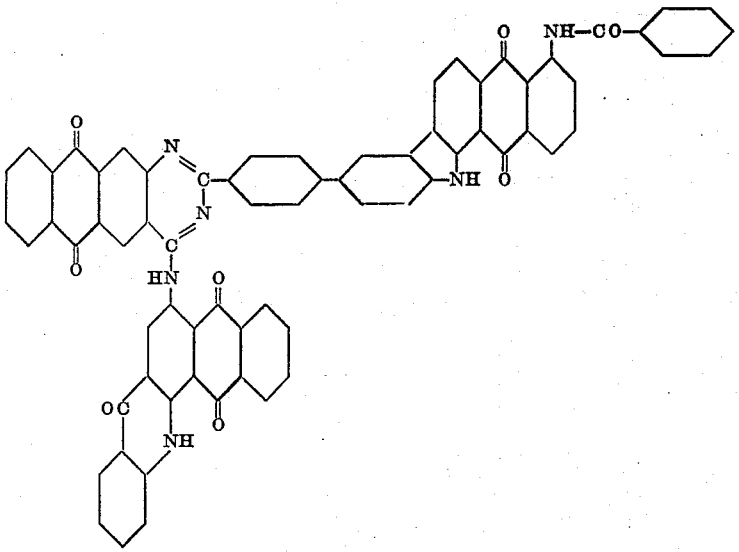
12. The anthraquinone vat dyestuff of the formula
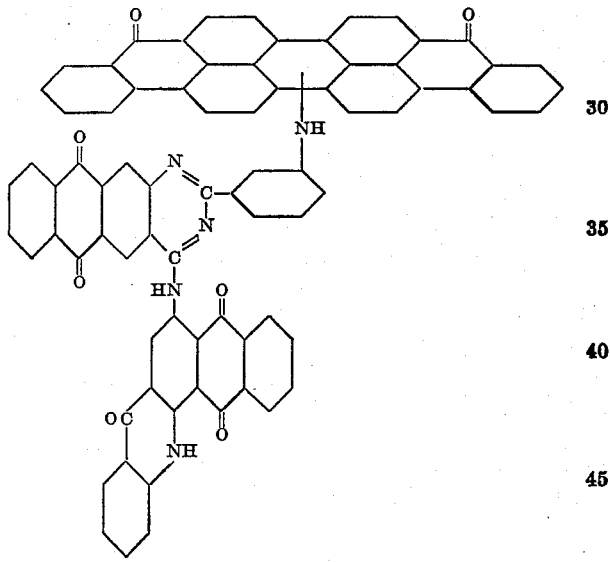
No references cited.